United States Patent [19]

Steinetz et al.

[11] Patent Number: 5,332,239
[45] Date of Patent: Jul. 26, 1994

[54] HIGH-TEMPERATURE, BELLOWS HYBRID SEAL

[75] Inventors: Bruce M. Steinetz, Broadview Heights; Paul J. Sirocky, Middleburg Heights, both of Ohio

[73] Assignee: The United States of America as represented by the Administrator of the National Aeronautics and Space Administration, Washington, D.C.

[21] Appl. No.: 7,874

[22] Filed: Jan. 22, 1993

[51] Int. Cl.$^5$ ............................................. F16J 15/16
[52] U.S. Cl. ...................................... 277/230; 277/75
[58] Field of Search ............... 277/27, 34, 34.3, 34.6, 277/75, 76, 88, 212 FB, 226, 229, 230, DIG. 6; 239/265.11, 265.19, 265.33, 265.37, 265.39

[56] References Cited

U.S. PATENT DOCUMENTS

| | | | |
|---|---|---|---|
| 2,165,296 | 7/1939 | Oass | 277/229 |
| 2,535,634 | 12/1950 | Hubbard | 277/229 |
| 2,814,517 | 11/1957 | Razdow | 277/226 |
| 2,924,471 | 2/1960 | Poltorak et al. | 288/10 |
| 3,044,805 | 7/1962 | McDonald | 285/45 |
| 3,361,432 | 1/1968 | Usher | 277/203 |
| 4,441,726 | 4/1984 | Uhl | 277/230 |
| 4,462,603 | 7/1984 | Usher et al. | 277/230 |
| 4,917,302 | 4/1990 | Steinetz et al. | 277/34 X |
| 4,931,326 | 6/1990 | Weil | 277/230 X |
| 5,014,917 | 5/1991 | Sirocky et al. | 239/265.11 |
| 5,082,293 | 1/1992 | Steinetz et al. | 277/3 |
| 5,134,030 | 7/1992 | Ueda et al. | 277/230 X |
| 5,145,191 | 9/1992 | Stewart et al. | 277/230 X |

Primary Examiner—William A. Cuchlinski, Jr.
Assistant Examiner—John L. Beres
Attorney, Agent, or Firm—Gene E. Shook; Guy M. Miller; James A. Mackin

[57] ABSTRACT

A high-temperature hybrid seal is constructed of multiple elements to meet the many demands placed on the seal. The primary elements are: a central high-temperature bellows, a braided ceramic sheath covering the bellows, an outer abrasion resistant sheath covering the ceramic sheath, and a structurally-sound seal-end termination.

13 Claims, 3 Drawing Sheets

HIGH-TEMPERATURE, BELLOWS HYBRID SEAL

ORIGIN OF THE INVENTION

The invention described herein was made by an employee of the U.S. Government together with a contractor employee performing work under a NASA contract and is subject to the provisions of Section 305 of the National Aeronautics and Space Act of 1958, Public Law 85-568 (72 Statute 435; 42 USC 2457).

TECHNICAL FIELD

This invention is concerned with an improved flexible seal for operation at high temperatures. The invention is particularly concerned with sealing gaps between movable structural panels or elements of advanced aerospace vehicles, such as hypersonic vehicles.

A seal constructed in accordance with the present invention is useful in sealing the gaps between movable panels and adjacent engine sidewall panels typical of advanced ramjet-scramjet engines. Gaps caused by pressure and thermal loads on the weight minimized, relatively compliant engine sidewalls can be as large as 0.25 inch in an 18-inch span which requires a very compliant "serpentine" seal to conform to the sidewall deformations. Complicating the sealing function is the requirement to conform and seal against these large distortions during dynamic, hot operation.

Flow path conditions within these engines are extreme with static gas temperatures ranging from about 1200° F. to about 5000° F. Pressure differentials up to about 100 psi may be encountered, depending on engine configuration and axial flow path position within each engine.

It is, therefore, a primary object of the invention to prevent the extremely hot, pressurized flowpath gases containing potentially explosive hydrogen and oxygen mixtures from leaking past the movable engine panels to back engine cavities, thereby causing loss of an engine or even an entire vehicle.

A further object of the invention is to provide a seal which conforms to expected engine sidewall distortions.

Another object of the invention is to provide a seal which is constructed of multiple elements to meet the many demands placed on the seal during high temperature operations.

BACKGROUND ART

U.S. Pat. No. 2,924,471 to Poltorak et al is directed to gaskets for high temperature services which resist corrosion of fluids and gases. The gasket comprises a strip of fabric knitted from metallic strands rolled laterally into superposed convolutions to form a center. A jacket comprising at least one layer of fabric surrounds this center, and a flexible coating on the outer surface of the jacket forms an elastomeric coating which is partially imbedded in the coating and bonded thereto.

U.S. Pat. No. 3,044,805 to McDonald discloses a bellows-type expansion compensator having a spring-controlled tubular braided shroud. Tension is placed on the shroud to prevent the bellows from bulging on either side.

U.S. Pat. No. 3,361,432 to Usher describes a packing ring used for sealing mechanical devices around rotating or sliding shafts. The packing ring includes a core comprising a knitted wire mesh tube which is rolled on itself to form a seamless ring having spiral convolutions. A sealant covers the core and an outer layer comprising another layer of sealant, and a coating of solid lubricant surrounds the sealant over the core. The knitted wire mesh material in the core provides individual springs which enables the spring rate to be controlled by subjecting the ring to a compression step.

U.S. Pat. No. 4,441,726 to Uhl discloses a heat and vibration resistant seal construction for a valve assembly. The seal utilizes a core member constructed of a dense, resilient material which retains its spring-like properties at elevated service temperatures. An intermediate wrap member of braided ceramic fiber forms a coextensive cover for the core, while an outer wrap member constructed of braided wire metal mesh surrounds the immediate wrap.

U.S. Pat. Nos. 5,014,917 and 5,082,293 which issued to the Applicants show several types of high temperature seals that are mounted in rectangular grooves in a movable structural panel.

DISCLOSURE OF THE INVENTION

A high temperature, bellows hybrid seal constructed in accordance with the present invention utilizes multiple elements. The structure includes a central high temperature bellows, a braided ceramic sheath, an outer abrasion resistant sheath, and a structurally sound seal end termination.

The bellows is fabricated of a high temperature metal, such as a nickel-, iron-, or cobalt-based superalloy. The outer abrasion resistant sheath also is a nickel-, iron-, or cobalt-based superalloy metal.

BRIEF DESCRIPTION OF THE DRAWINGS

The objects, advantages, and novel features of the invention will be more fully apparent from the following detailed description when read in connection with the accompanying drawings wherein.

BEST MODE FOR CARRYING OUT THE INVENTION

Figure 1:
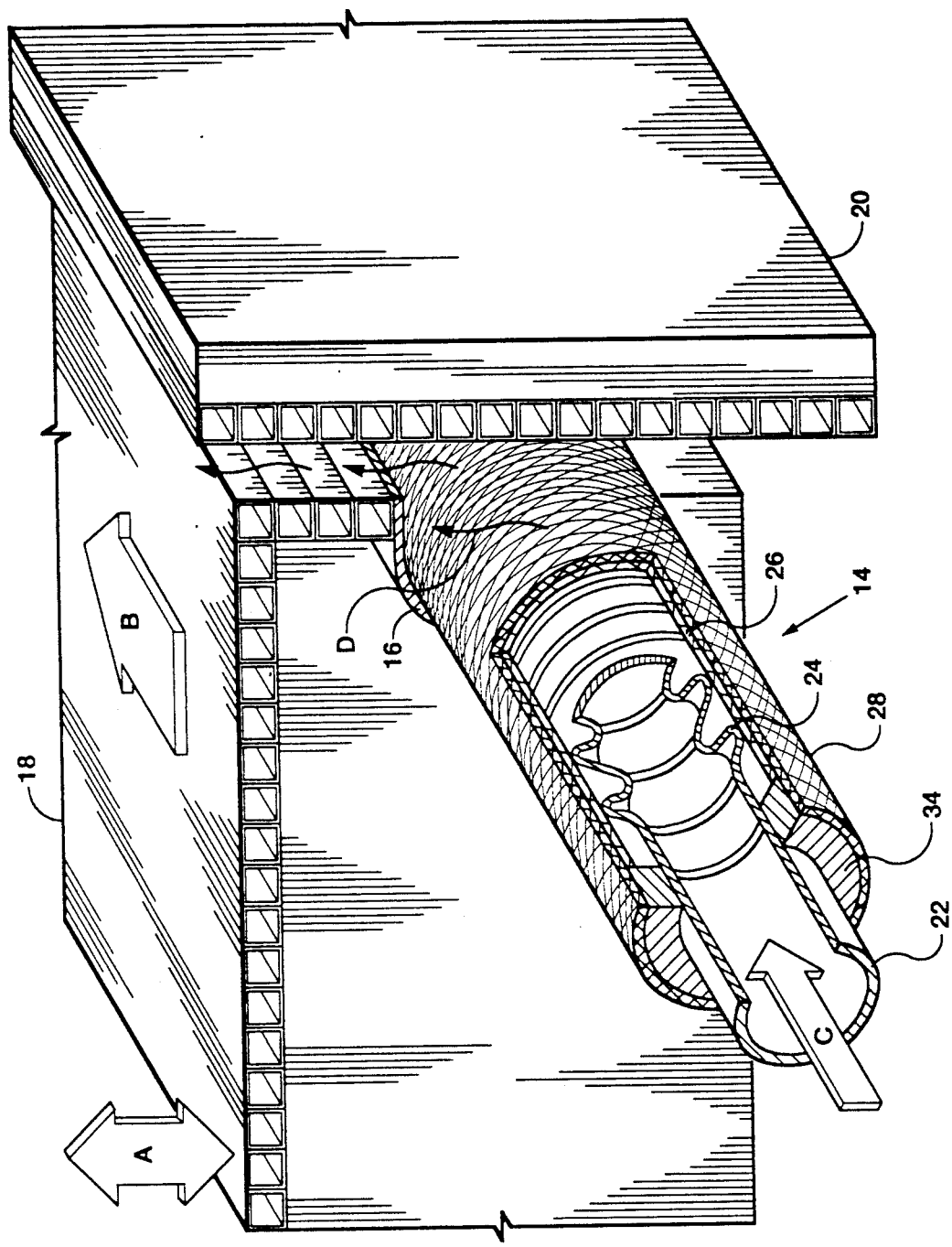
FIG. 1 is a perspective view, partially in section, of a high temperature bellows hybrid seal constructed in accordance with the invention.

Referring now to the drawings, there is shown in FIG. 1 a seal 14 mounted in a channel 16 along the side of a movable engine panel 18. The arrow "A" indicates the direction of motion of the panel 18 and the seal 14 as they traverse an adjacent sidewall 20 or splitter wall. The hybrid seal 14 prevents high temperature, high pressure engine flow-path gases depicted by the arrow "B" from leaking through the interface between the panel 18 and the sidewall 20.

Referring again to FIG. 1, there is shown the detailed basic construction of the high-temperature hybrid seal 14 that utilizes multiple elements to meet the many demands placed on such a seal. The apparatus 14 includes a central high-temperature bellows 22 having a plurality of convolutions 24. A braided ceramic sheath 26 covers the bellows 22 and convolutions 24. An outer abrasion-resistant sheath 28 protects the braided ceramic sheath 26.

Each of the elements of the seal fulfills several purposes. By way of example, the central convoluted bellows 22 serves as a flexible internal structural support preventing the seal 14 from collapsing upon itself during rigorous engine operation. The central bellows 22 may be fabricated by roll-forming.

The bellows 22 also serves as a central cooling passageway for distributing coolant to those engine stations where the ambient temperature is above the operating temperature of the seal. The flow of pressurized coolant is indicated by the arrow "C" in FIGS. 1 and 2.

Seal cooling is afforded by conduction to the "cooled" central bellows 22. Additional cooling is obtained by purging coolant through the walls of the bellows 22 through small holes or "micro-pores" in the bellows sidewalls. The size of these micro-pores is effective in metering the proper flow rates of coolant to the seal as a function of seal length. Flow of pressurized purge coolant radially through the bellows 22 and the sheath layers 26 and 28 preloads the sheath 26 against the adjacent sidewall 20. This purge cooling transpires through the seal 14 as illustrated by the arrows "D", and it is effective for seal operations in the severe heat flux zones anticipated within the hypersonic and rocket engines being considered.

The ceramic sheath 26 is braided of commercially available high temperature ceramic fibers. These fibers are braided using either a two-dimensional or a three-dimensional braiding technique which forms a dense, yet flexible structure. High braid angles have been found to give higher leakage flow resistance for these structures. Under mildly dynamic or static sealing applications where the seal 14 must operate at its highest operating temperatures, which is up to the limits of the fibers used in the seal construction, this ceramic braided sheath 26 may be the outermost element. However, for damaging dynamic sealing applications, tests reveal durability limitations with this "ceramic only" sheath.

For applications where the seal 14 must endure damaging, sliding, or pinching conditions, the durable metal sheath 28 is braided over the ceramic sheath 26. This seal structure was tested using a thin superalloy sheath 28 braided over a ceramic core and showed excellent durability at both room temperatures and high temperatures. This structure survived 2000 cycles at 1300° F. with no change in appearance.

Various structures have been incorporated into the seal 14 for limiting leakage through the metallic sheath 28. By way of example, very fine superalloy metal wires were used to reduce the leakage flow. These wires had diameters between about 0.0005-inch to about 0.004-inch.

In another embodiment the metal wires forming the sheath 28 were covered with high-temperature braze alloy. These covered wires were brazed in a furnace to virtually eliminate any voids between the fibers giving a near leak-tight seal.

In still another embodiment the wires forming the sheath 28 were combined with yarns of the ceramic fibers of considerably smaller diameters to fill the voids between the wires. In this embodiment the metal fibers act to resist the abrasion while the ceramic fibers act to resist the leakage flow.

In yet another embodiment braze alloy in the form of wire was braided in with the seal structure. This assembly was then brazed to produce a dense packed structure.

In yet another embodiment, wires in the form of solid film lubricants can be braided into the abrasion resistant sheath reducing friction coefficients between the seal and adjacent sidewall surface.

Materials used in the construction of the seal 14 must be capable of sustaining the rigorous environments of the advanced engines in which they are used. These materials must be capable of sustaining high temperatures and pressures. The materials must also be resistant to oxidation and hydrogen embrittlement at high operating temperatures.

The bellows 22 is fabricated of a superalloy metal, including nickel-, iron-, and cobalt-based superalloys. A commercial superalloy metal known as Inconel 718 can be used at temperatures over 1200° F. A commercially available cobalt-based superalloy known as Haynes 188 can be used at temperatures up to 1800° F. These materials are also resistant to oxidation and hydrogen embrittlement up to their rated temperatures.

The high temperature ceramic sheath 26 is braided of ceramic fibers selected based on their high temperature strength, flexibility, chemical resistance, and insulative properties. High temperature ceramic based fibers made of alumina-silicate or alumina-boria-silicate, such as commercially available Nextel 550, Nextel 440, and Nextel 312, are used in the braided sheath 26. Also, alumina in the form of commercially available Nextel 610 or hybrid ceramic fibers, such as carboxynitride (HPZ) can be used. Durability tests done with yarns of the fibers used in the ceramic sheath indicated superior abrasion resistance of Nextel 550 and the Nextel 610 fiber materials.

The outer metal sheath 28 is braided of filaments drawn from the aforementioned high temperature nickel-, iron- or cobalt-based superalloy metals. These materials include Inconel 600, 718 and X-750, Haynes 188, 230 and 25 as well as Hoskins 875.

Figure 2:
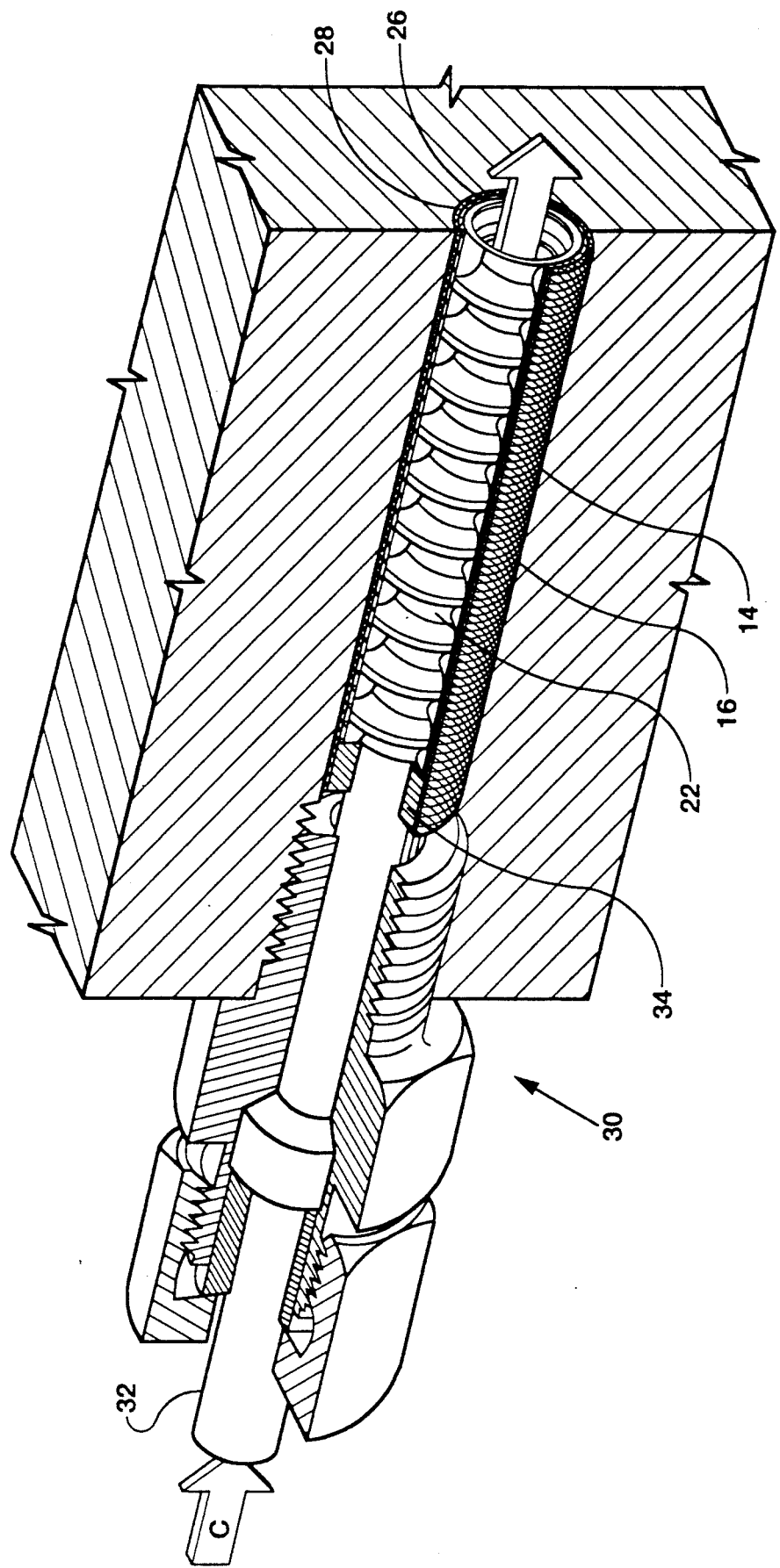
FIG. 2 is a perspective axial quarter section view illustrating the mounting of the bellows hybrid seal in an engine.

The bellows 22 also provides an effective means of joining or attaching the seal 14 to adjacent structural elements as shown in FIG. 2. More particularly, the metal bellows 22 provides the means to attach a fitting 30 at the end of the seal for joining the seal 14 to adjacent structural elements. The fitting 30 is preferably a type that is commercially available, such as one sold under the name "Conax", and it forms no part of the invention. The fitting 30 connects the seal 14 to the engine purge system through a coolant line 32 to supply the gaseous coolant indicated by the arrow C in FIG. 1 to the bellows 22. The fitting 30 is threadably attached to the panel 18.

It is apparent from FIG. 2 that the metallic outer sheath 18 has a second function in that it closes out the attachment to a metal ring end-fitting 34. More particularly, the metal sheath 28 extends over the end-fitting 34. In this manner the entire seal end-termination is furnace brazed together to provide a leak tight, structurally strong seal termination, as shown in FIG. 2.

The braze alloys used to attach the sheath 28 to the end fitting 34 are any materials that "wet" the parent wire materials. Such braze alloys include, but are not limited to, the alloys containing gold-palladium-nickel, which are known commercially as the Palniro braze series. The aforementioned commercially available Haynes 230 wire used in the outer sheath 28 has been successfully wetted by Palniro series braze alloys.

DESCRIPTION OF ALTERNATE EMBODIMENTS

Figure 3:
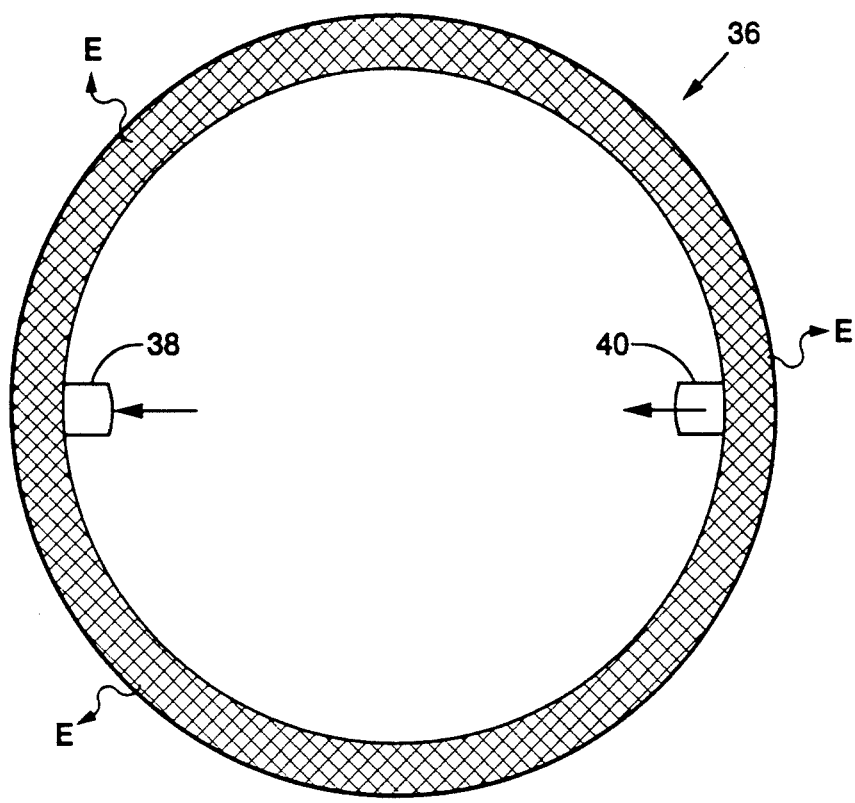
FIGS. 3 and 4 are schematic views showing alternate embodiments of the invention.

In addition to the linear configuration of the preferred embodiment the seal of the present invention can be constructed in a number of other useful shapes. Referring now to FIG. 3, there is shown a hinge seal 36 for engine applications requiring panel articulation. The seal 36 is fabricated in a circular shape instead of the linear configuration as previously described.

Pressure and coolant are supplied to the seal 36 through a "T" port 38 that is operably connected to a suitable coolant supply (not shown). The coolant is removed from the seal through a similar "T" port 40 or by transpiring through the seal, as shown by the arrows "E".

Figure 4:
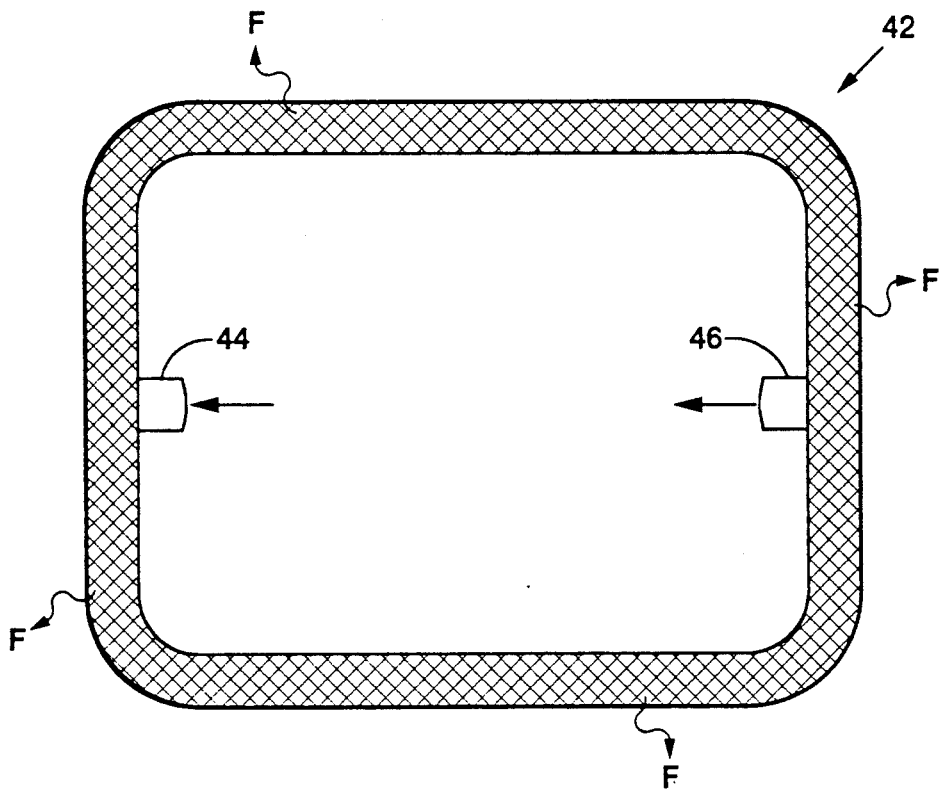

Referring to FIG. 4 there is shown a seal 42 having a "picture-frame" or "racetrack" configuration for sealing static structural panel interfaces. The seal 42 has an intake "T" port 44 that is connected to a source of coolant (not shown) for central purging. A suitable discharge "T" port 46 is provided for completion of the central purging. Also, coolant may be transpired through the seal 42 as indicated by the arrows "F".

A beneficial technical effect of a seal constructed in accordance with the present invention is that the central bellows 22 provides a structural center support which prevents the otherwise hollow seal from collapsing in on itself under load. The bellows 22 further provides a central flexible purge manifold judiciously distributing scarce coolant resources along the length of the seal 14. In addition, this bellows 22 forms a structurally sound attachment for joining the seal structure to its engine purge source.

Another beneficial technical effect is achieved by the metal sheath 28 which is an excellent abrasion resistant element that can withstand high temperatures while resisting tearing and pinching. The metal sheath 28 offers low friction coefficients which are less than half those of all ceramic type sheaths. Low friction is essential to reduce the demands on the panel actuating systems. Also, low friction reduces seal wear and wear on the adjacent engine panels.

For applications requiring near leak-free performance, the braze alloy filler in the metal sheath reduces voids between the fibers thereby insuring minimum seal leakage. Selection of gold-based braze alloys wet the fibers and can reduce friction coefficients even further.

It is contemplated the apparatus of the present invention can be used for sealing gaps between movable structural panels of advanced hypersonic engines and sealing gaps of articulating control-surfaces of hypersonic vehicles. This device can further be used for sealing locations such as crew; access; cargo-bay and landing gear doors of advanced hypersonic vehicles subject to high temperatures.

This sealing apparatus is also useful for sealing gaps between movable structural panels of 2-D variable geometry exhaust nozzles. In addition, the structure is used to seal gaps between movable engine elements of advanced single-stage-to-orbit vehicles including the elements of the aero-spike engine.

While several embodiments of the invention have been disclosed and described, it will be appreciated that various structural modifications may be made to the disclosed seals without departing from the spirit of the invention or the scope of the subjoined claims. Along these lines the main elements of the seal such as the bellows geometry or materials; seal end-terminations, ceramic fiber diameters, cross-sections or materials; the metal fiber diameters, cross-sections or materials; the braid geometry, lay-up and relative thicknesses are all parameters that can be optimized for a given seal application.

What is claimed:

1. Apparatus for sealing a gap between a movable panel and an adjacent sidewall spaced therefrom to inhibit leakage of gases from a high pressure side to a low pressure side, said apparatus comprising
   a centrally disposed bellows having a plurality of convolutions,
   a braided sheath covering said bellows, and
   an outer abrasion resistant sheath covering said braided sheath, said outer abrasion resistant sheath comprising braided superalloy metal wires and ceramic fibers combined with said metal wires.

2. Sealing apparatus as claimed in claim 1 wherein the ceramic fibers have smaller diameters than the metal wires whereby the metal wires resist abrasion and the ceramic fibers resist leakage flow.

3. Sealing apparatus as claimed in claim 1 wherein the apparatus has a circular configuration.

4. Sealing apparatus as claimed in claim 1 wherein the apparatus has a rectangular configuration.

5. Sealing apparatus as claimed in claim 1 including means for supplying coolant to the interior of said bellows.

6. Sealing apparatus as claimed in claim 5 wherein the bellows is provided with a plurality of micro-pores in the sidewalls thereof whereby transpiration cooling is provided by coolant being metered therethrough.

7. Sealing apparatus as claimed in claim 1 wherein the braided sheath is a ceramic material.

8. Sealing apparatus as claimed in claim 1 wherein the superalloy metal wires have diameters between about 0.0005 inch and 0.004 inch.

9. Apparatus for sealing a gap between a movable panel and an adjacent sidewall spaced therefrom to inhibit leakage of gases from a high pressure side to a low pressure side, said apparatus comprising
   a centrally disposed bellows having a plurality of convolutions,
   a braided sheath covering said bellows, and
   an outer abrasion resistant sheath comprising braided superalloy wires covering said braided sheath, said wires being covered with a braze alloy and heated to brazing temperatures thereby eliminating voids between said wires.

10. Apparatus for sealing a gap between a movable panel and an adjacent sidewall spaced therefrom to inhibit leakage of gases from a high pressure side to a low pressure side, said apparatus comprising
    a centrally disposed bellows having a plurality of convolutions,
    a braided sheath covering said bellows, and
    an outer abrasion resistant sheath covering said braided sheath, said outer abrasion resistant sheath comprising braided superalloy metal wires with braze alloy wires braided into the outer sheath structure.

11. Apparatus for sealing a gap between a movable panel and an adjacent sidewall spaced therefrom to inhibit leakage of gases from a high pressure side to a low pressure side, said apparatus comprising
    a centrally disposed bellows having a plurality of convolutions, a braided sheath covering said bellows, an outer abrasion resistant sheath covering said braided sheath, and means on at least one end of said outer sheath for mounting said apparatus on said movable panel.

12. Sealing apparatus as claimed in claim 11 wherein the mounting means includes a metal end fitting brazed to said outer sheath.

13. In a sealing apparatus of the type having a centrally disposed bellows with a plurality of convolutions, the improvement comprising at least one sheath of braided ceramic material for covering said bellows, an outer abrasion resistant sheath of braided superalloy metal wires and ceramic fibers combined with said metal wires, and means for attaching said bellows and said one sheath together.

* * * * *